(12) United States Patent
Vaudenay

(10) Patent No.: US 6,553,120 B1
(45) Date of Patent: Apr. 22, 2003

(54) METHOD FOR DATA DECORRELATION

(75) Inventor: Serge Vaudenay, Bretigny sur Orge (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/297,075

(22) PCT Filed: Nov. 4, 1997

(86) PCT No.: PCT/FR97/01975

§ 371 (c)(1),
(2), (4) Date: Jun. 28, 1999

(87) PCT Pub. No.: WO98/20643

PCT Pub. Date: May 14, 1998

(30) Foreign Application Priority Data

Nov. 4, 1996 (FR) .................................. 96 13411

(51) Int. Cl.$^7$ ............................... H04L 9/06; H04L 9/28
(52) U.S. Cl. .............................. 380/28; 380/29; 380/37; 380/42; 708/135; 708/501; 708/502; 708/523
(58) Field of Search .......................... 380/28, 29, 37, 380/42, 43, 46, 259, 260, 261, 262, 263, 265; 708/135, 501, 502, 523

(56) References Cited

U.S. PATENT DOCUMENTS 5,345,507 A * 9/1994 Herzberg et al. ............. 380/28
5,448,640 A * 9/1995 Kim et al. .................. 370/515
6,078,663 A * 6/2000 Yamamoto ................. 380/260

OTHER PUBLICATIONS

Kilian, J. et al., "How to Protect DES Against Exhaustive Key Search", Advances in Cryptology—Crypto '96, 16th Annual International Cryptology Conference, Santa Barbara, Aug. 18–22, 1996. Proceedings, No. Conf. 16, Aug. 18, 1996, Koblitz, No. (ED), pp. 252–267, XP000626592.

Even, S. et al., "A Construction of a Cipher from a Single Pseudorandom Permutation", Advances in Cryptology—Asiacrypt, Fujiyoshida, Nov. 11–14, 1991, No. Conf. 1, Nov. 11, 1991, Hideki Imai; Rivest R. L., Tsutomu Matsumoto, pp. 210–244, XP000473951.

Shepherd, S.J., "A High Speed Software Implementation of the Data Encryption Standard", Computers and Security International Journal Devoted to the Study of Technical and Financial Aspects of Computer Security, vol. 14, No. 4, Jan. 1, 1995, pp. 349–357, XP000523914.

* cited by examiner

Primary Examiner—Justin T. Darrow
(74) Attorney, Agent, or Firm—Greenblum & Bernstein, P.L.C.

(57) ABSTRACT

Method for the cryptography of data recorded on a medium usable by a computing unit in which the computing unit processes an input information x using a key for supplying an information F(x) encoded by a function F. The function uses a decorrelation module $M_k$ such that $F(x)=[F'(M_k)](x)$, in which K is a random key and F' a cryptographic function. This Abstract is neither intended to define the invention disclosed in this specification nor intended to limit, in any manner, the scope of the invention.

12 Claims, 1 Drawing Sheet

METHOD FOR DATA DECORRELATION

BACKGROUND OF THE INVENTION

1. Field of the Invention

This invention relates to a method for decorrelating data recorded on a medium exploitable by a processing unit.

2. Description of Background and Relevant Information

There are many known methods of data encryption or cryptography. They serve to encode data such that the latter can be read only by an authorised recipient who possesses a key. Their importance is developing simultaneously with information networks and their use can be expected to become widespread in accordance with legislation in force.

Some encryption methods can provide unconditional security, but call upon heavy technical means which slow down communications or make the key exchange management very costly, while others cannot even be used practically.

For instance, to encrypt a flow of clear messages, the Vernam encryption method requires a flow of keys of the same length. Synchronisation between the sender and receiver then becomes difficult to achieve.

The conditions for unconditional security were formalised in 1949 by Shannon, who was able to demonstrate on the basis of information theory that unconditional security requires that the key must be at least equal to the total size of the messages that can be encrypted without corruption.

Thus, an encryption operation is carried out to ensure the protection of data recorded on a medium exploitable by a processing unit and liable to be transmitted. For the encryption of a series of messages to be secure, it is necessary to make these operations independent over a small number of messages.

The main encryption function used at present is the digital data encryption standard (DES) adopted by the U.S. government. This function is based on the (sixteen-fold) iteration of simple functions following the so-called "Feistel" scheme. The purpose of the large number of iterations is to weaken the correlation between the encrypted messages.

The DES is described in many documents and in particular the publication entitled "Encryption, Theory and Practice" by Douglas STINSON (International Thomson Publishing).

To improve the reliability of encryption and to safeguard against exhaustive searches, it has been proposed to increase the length of the key, or even to introduce a decorrelation of order 1. This is what has been submitted by the authors of the following two articles: Advances in Cryptology—CRYPTO '96, $16^{th}$ Annual International Cryptology Conference, Santa Barbara, Aug. 18–22, 1996, Proceedings no. Conf. 16, Aug. 18, 1996, Koblitz N (ED), pages 252–267 by KILIAN J. et al., and Advances in Cryptology—ASIACRYPT, Fujiyoshida, Nov. 11–14, 1991, no. Conf. 1, Nov. 11, 1991, Hideki Imai; Rivest R L; Tsutomu Matsumoto, pages 210–224 by EVEM S. et al.

However, such measures are not sufficient to protect against attacks made possible by the recently-developed linear and differential cryptanalysis techniques.

SUMMARY OF THE INVENTION

The object of the invention is thus to provide a data encryption method which provides optimal security and which can be implemented with relatively simple functions only requiring modest calculation resources.

To this end, the invention relates to a method for the cryptography of data stored on a medium exploitable by a computing unit in which the computing unit processes an input information x by means of a key to provide information F(x) encoded by a function F.

According to the invention, the function F uses a decorrelation module $M_K$, of rank at least equal to two, such that $F(x)=[F'(M_K)](x)$, where K is a random key and F' is a cryptographic function.

Generally speaking, a decorrelation module serves to transform a message x by the function $M_K$ involving a key, such that the distribution $M_K(x_1), \ldots, M_K(x_t)$ obtained from any t different messages with a random variation of the key has a uniform or quasi uniform distribution.

Such a decorrelation module can thus be employed within a data encryption device, possibly after an information dividing device which supplies fixed length data $x_0$ in response to the input information x.

The invention can be implemented so that t blocks of messages $c_1, \ldots, c_1$ coded by the function F do not give any statistical information on that function.

In different embodiments each having particular advantages, the invention has the following features according to any technically feasible combinations thereof:

- the input information x is divided up into elements $x_0$ of fixed length,
- the function F is of the form $F(x)=F'(M_K(x))$,
- the coding function F' is divided up into two functions F" and G" and $$F(x)=F''(M_K(G''(x))),$$

- the decorrelation module $M_K$ is inversible,
- the decorrelation module is $M_K(x)=ax+b$, where K=(a, b) with a≠0,
- the decorrelation module is $M_K(x)=a/(x+b)+c$, where K=(a, b, c) with a≠0,
- the function F is a Feistel function applying n iterations each with a function Fi,
- the decorrelation module $M_K$ is non-inversible,
- at each iteration, $F_i(x)=F'_i(M_K(x))$,
- at each iteration, $F_i(x)=F''_i(M_K(G''_i(x)))$,
- $M_K(x)=k_1+k_2x+k_3x^2+\ldots+k_tx^{t-1}$,
- where K=($k_1, k_2, k_3, \ldots, k_t$).

BRIEF DESCRIPTION OF THE DRAWINGS

The invention shall now be described in more detail with reference to the figure and the specific embodiments.

DETAILED DESCRIPTION OF THE INVENTION

Figure 1:
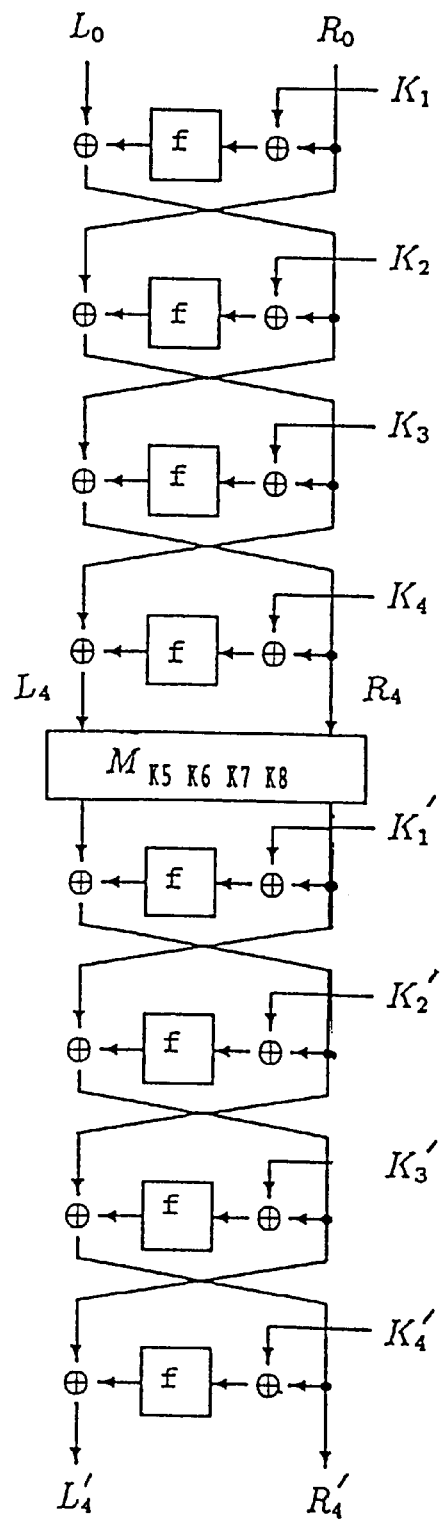
FIG. 1 shows the invention applied in a Feistel scheme with eight iterations.

Advantageously, the inventive method for encrypting recorded data implements a secret key using a decorrelation module $M_K$ such that $F(x)=[F'(M_K)](x)$, where K is a random key and F' a coding function.

The function F' is advantageously divided up into two functions F" and G", and $F(x)=F''(M_K(G''(x)))$.

The use of such decorrelation modules is applicable to inversible functions F and also to any function F.

When the function F is inversible, the cryptographic method is an encryption method; the holder of the key can then reconstitute the inputted information. When the function F is not inversible, the cryptographic method allows the authentication of data.

Thus, for a parameter value t=2, the function $M_K$ is advantageously:

$$M_K(x)=ax+b$$

Where K=(a, b) with a≠0, and where the sign + represents a translation of the message space.

The decorrelation is then perfect at order 2. The inverse operation is:

$$(M_K)^{-1}(y)=a^{-1}y-a^{-1}b$$

In another embodiment for a parameter value t=3, the function $M_K$ is advantageously:

$$M_K(x)=a/(x+b)+c,$$

Where K=(a, b, c) with a≠0. In this operation, it is taken that 1/0=0. The inverse operation is then:

$$(M_K)^{-1}(y)=a/(y-c)-b$$

The use of a decorrelation module $M_K$ is equally advantageous in the case of non-inversible functions.

We use an algebraic structure such as messages which define addition and multiplication. For example, we use the arithmetic in a finite body or a truncated modulo arithmetic in a prime number.

For all parameter values t, we can then propose a decorrelation function having the form $M_K(x)=k_1+k_2x+k_3 x^2+\ldots+k_tx^{t-1}$, where K=($k_1, k_2, k_3, \ldots k_t$).

The scheme for such a Feistel encryption is shown in FIG. 1.

A block of clear text x having 64 bits: we then set $x=L_0R_0$ where $L_0$ contains the first 32 bits of the string x and $R_0$ contains the remaining 32 bits.

Four iterations of a same function f are applied to x. We calculate $L_iR_i$, for 1≤i≤4, following the rule:

$$L_i=R_{i-1}$$

$$R_i=L_{i-1}+f(R_{i-1}+K_i)$$

Where the + sign represents a bit-by-bit exclusive OR of two strings; $K_1, K_2, K_3, K_4$ are 32-bit strings calculated from K.

The result is ($L_4, R_4$). It is assembled in the form $L_4R_4$ to which we apply the decorrelation module, for example:

$$K_5K_6 \times L_4R_4+K_7K_8$$

$K_5, K_6, K_7, K_8$ each being a 32-bit string.

The result serves as input $L'_0R'_0$ for a second function according to the Feistel scheme, analogous to the preceding one that produces a result $L'_4R'_4=F(x)$.

$K'_1, K'_2, K'_3, K'_4$ are also 32-bit strings.

The key here is $K_1, K_2, K_3, K_4, K'_1, K'_2, K'_3, K'_4, K_5, K_6, K_7, K_8$.

Generally speaking, the functions F" and G" can be any encryption function.

Two specific embodiments shall now be described in detail:

In the first of these preferred embodiments, a Feistel scheme with eight iterations is used. G" is the successive application of four functions $f_1, f_2, f_3, f_4$, and F" is the successive application of four functions $f_5, f_6, f_7, f_8$, the functions $f_1$ being defined from a function f and from the random key K.

The function f is itself defined in the following way:

If x is a 32-bit word, we first define φ(x):

$$\phi(x)=x+256.S(x\bmod 256)\bmod 2^{32}$$

where S is e.g. a function represented by the tables in appendix 1, with u represented in the abscissa and v in the ordinate each being hexadecimal numbers, we associate with the pair (u, v) x the value S(x) having the value indicated at the co-ordinates (u, v).

f(x) is defined by:

$$f(x)=\phi(R^{11}_L(\phi(x))+r \bmod 2^{32})$$

where $R^{11}_L$ is a circular permutation of eleven bits to the left and r is a constant, e.g. itself defined by s as follows:

$$r = b7s15162 \quad \text{and}$$

$$s = \sum_{i=0}^{\infty} \frac{1}{i!} = \text{b7e15162 8aed2a 6abf71 58809c f4f3c7 62e716 \ldots}$$

The key K is a 256-bit string formed by linking together eight strings $K_i$ each of 64 bits: K=($K_1 K_2 K_3 \ldots K_8$).

The Feistel scheme is then implemented with the functions $f_i$:

$$f_i(x)=f(\oplus k_i)$$

Where the ki are then defined as follows:

| i | 1 | 2 | 3 | 4 |
|---|---|---|---|---|
| $k_i$ | K1 | $K_1 \oplus K_3$ | $K_1 \oplus K_3 \oplus K_4$ | $K_1 \oplus K_4$ |
| i | 5 | 6 | 7 | 8 |
| $k_i$ | K2 | $K_2 \oplus K_3$ | $K_2 \oplus K_3 \oplus K_4$ | $K_2 \oplus K_4$ | the decorrelation module is:

$$M(uv)=(uv \oplus K_5K_6) \times K_7K_8$$

In the second of these preferred embodiments, we use a Feistel scheme with thirty two iterations:

Compared with the first example, the key K is a 2048-bit string, r can keep its value and the function f is replaced by f':

$$f'(x)=R^{11}_L(x)+r \bmod 2^{32}$$

The functions $f_i$ are replaced by the functions $f'_i$:

$$f'_i(x)=f'(x.K_{2i+1}+K_{2i} \bmod 2^{32}-5).$$

APPENDIX 1

TABLE 1

S(u, v) for v < 8

|    | .0     | .1     | .2     | .3     | .4     | .5     | .6     | .7     |
|----|--------|--------|--------|--------|--------|--------|--------|--------|
| 0. | 8aed2a | 6abf71 | 58809c | f4f3c7 | 62e716 | 0f38b4 | da56a7 | 84d904 |
| 1. | bb1185 | eb4f7c | 7b5757 | f59584 | 90cfd4 | 7d7c19 | bb4215 | 8d9554 |
| 2. | cfbfa1 | c877c5 | 6284da | b79cd4 | c2b329 | 3d20e9 | e5eaf0 | 2ac60a |
| 3. | 78e537 | d2b95b | b79d8d | caec64 | 2c1e9f | 23b829 | b5c278 | 0bf387 |
| 4. | bbca06 | 0f0ff8 | ec6d31 | beb5cc | eed7f2 | f0bb08 | 801716 | 3bc60d |
| 5. | 94640d | 6ef0d3 | d37be6 | 7008e1 | 86d1bf | 275b9b | 241deb | 64749a |
| 6. | f10de5 | 13d3f5 | 114b8b | 5d374d | 93cb88 | 79c7d5 | 2ffd72 | ba0aae |
| 7. | 571121 | 382af3 | 41afe9 | 4f77bc | f06c83 | b8ff56 | 75f097 | 9074ad |
| 8. | 5a7db4 | 61dd8f | 3c7554 | 0d0012 | 1fd56e | 95f8c7 | 31e9c4 | d7221b |
| 9. | c6b400 | e024a6 | 668ccf | 2e2de8 | 6876e4 | f5c500 | 00f0a9 | 3b3aa7 |
| a. | d1060b | 871a28 | 01f978 | 376408 | 2ff592 | d9140d | b1e939 | 9df4b0 |
| b. | c703f5 | 32ce3a | 30cd31 | c070eb | 36b419 | 5ff33f | b1c66c | 7d70f9 |
| c. | 6d8d03 | 62803b | c248d4 | 14478c | 2afb07 | ffe78e | 89b9fe | ca7e30 |
| d. | df2be6 | 4bbaab | 008ca8 | a06fda | ce9ce7 | 048984 | 5a082b | a36d61 |
| e. | 558aa1 | 194177 | 20b6e1 | 50ce2b | 927d48 | d7256e | 445e33 | 3cb757 |
| f. | 6b6c79 | a58a9a | 549b50 | c58706 | 90755c | 35e4e3 | 6b5290 | 38ca73 |

TABLE 2

S(u, v) for v ≥ 8

|    | .8     | .9     | .a     | .b     | .c     | .d     | .e     | .f     |
|----|--------|--------|--------|--------|--------|--------|--------|--------|
| 0. | 5190cf | ef324e | 773892 | 6cfbe5 | f4bf8d | 8d8c31 | d763da | 06c80a |
| 1. | f7b46b | ced55c | 4d79fd | 5f24d6 | 613c31 | c3839a | 2ddf8a | 9a276b |
| 2. | cc93ed | 874422 | a52ecb | 238fee | e5ab6a | dd835f | d1a075 | 3d0a8f |
| 3. | 37df8b | b300d0 | 1334a0 | d0bd86 | 45cbfa | 73a616 | 0ffe39 | 3c48cb |
| 4. | f45a0e | cb1bcd | 289b06 | cbbfea | 21ad08 | e1847f | 3f7378 | d56ced |
| 5. | 47dfdf | b96632 | c3eb06 | 1b6472 | bbf84c | 26144e | 49c2d0 | 4c324e |
| 6. | 7277da | 7ba1b4 | af1488 | d8e836 | af1486 | 5e6c37 | ab6876 | fe690b |
| 7. | 9a787b | c5b9bd | 4b0c59 | 37d3ed | e4c3a7 | 939621 | 5edab1 | f57d0b |
| 8. | bed0c6 | 2bb5a8 | 7804b6 | 79a0ca | a41d80 | 2a4604 | c311b7 | 1de3e5 |
| 9. | e6342b | 302a0a | 47373b | 25f73e | 3b26d5 | 69fe22 | 91ad36 | d6a147 |
| a. | e14ca8 | e88ee9 | 110b2b | d4fa98 | eed150 | ca6dd8 | 932245 | ef7592 |
| b. | 391810 | 7ce205 | 1fed33 | f6d1de | 9491c7 | dea6a5 | a442e1 | 54c8bb |
| c. | 60c08f | 0d61f8 | e36801 | df66d1 | d8f939 | 2e52ca | ef0653 | 199479 |
| d. | 1e99f2 | fbe724 | 246d18 | b54e33 | 5cac0d | d1ab9d | fd7988 | a4b0c4 |
| e. | 2b3bd0 | 0fb274 | 604318 | 9cac11 | 6cedc7 | e771ae | 0358ff | 752a3a |
| f. | 3fd1aa | a8dab4 | 0133d8 | 0320e0 | 790968 | c76546 | b993f6 | c8ff3b |

What is claimed is:

1. Method for cryptography of data stored on a medium exploitable by a computing unit in which said computing unit processes an input information x by way of a key K to provide information F(x) encoded by a function F, wherein the function F uses a decorrelation module $M_k$, of rank at least equal to two, to transform the input information such that a distribution obtained with a random variation of the key K is one of uniform and quasi uniform, and such that $F(x)=[F'(M_k)](x)$, where F' is a cryptographic function.

2. The method according to claim 1, wherein the input information x is divided into elements $x_0$ of fixed length.

3. The method according to claim 1, wherein the function F is of the form $F(x)=F'(M_K(x))$.

4. The method according to claim 1, wherein the function F' is divided into two functions F" and G" and in that $$F(x)=F''(M_K(G''(x))).$$

5. The method according to claim 1, wherein the decorrelation module $M_K$ is inversible.

6. The method according to claim 5, wherein the decorrelation module is $M_K(x)=ax+b$, where $K=(a, b)$ with $a\neq 0$.

7. The method according to claim 5, wherein the decorrelation module is $M_K(x)=a/(x+b)+c$, where $K=(a, b, c)$ with $a\neq 0$.

8. The method according to claim 1, wherein the decorrelation module $M_K$ is non-inversible.

9. The method according to claim 5, wherein the function F is a Feistel function applying n iterations each with a function $F_i$.

10. The method according to claim 9, wherein, at each iteration, $F_i(x)=F'_i(M_K(x))$.

11. The method according to claim 9, wherein the function F' is divided into two functions F" and G" and, at each iteration, $F_i(x)=F''_i(M_K(G''_i(x)))$.

12. The method according to claim 11, wherein $M_K(x)=k_1+k_2x+k_3x^2+ \ldots +k_ix^{i-1}$, where $K=(k_1, k_2, k_3 \ldots ,k_i)$.

* * * * *